US006903482B2

(12) United States Patent
Rehder et al.

(10) Patent No.: US 6,903,482 B2
(45) Date of Patent: Jun. 7, 2005

(54) ELECTRICAL CURRENT COLLECTOR CLEANING AND COOLING FOR HIGH VOLTAGE ROTATING MACHINES

(75) Inventors: Robert Henry Rehder, Peterborough (CA); Yangxin Li, Bowmanville (CA)

(73) Assignee: General Electric Canada Inc., Mississauga (CA)

( * ) Notice: Subject to any disclaimer, the term of this patent is extended or adjusted under 35 U.S.C. 154(b) by 54 days.

(21) Appl. No.: 10/689,588

(22) Filed: Oct. 22, 2003

(65) Prior Publication Data

US 2004/0100159 A1 May 27, 2004

(30) Foreign Application Priority Data

Nov. 21, 2002 (CA) .............................................. 2412303

(51) Int. Cl.[7] .......................... H02K 13/00; H02K 9/28; H01R 39/08
(52) U.S. Cl. ........................ 310/227; 310/219; 310/232
(58) Field of Search .............................. 310/52, 54, 58, 310/62, 63, 60 A, 219, 227, 228, 231, 232

(56) References Cited

U.S. PATENT DOCUMENTS

| | | | | |
|---|---|---|---|---|
| 1,719,407 A | * | 7/1929 | Trudeau | ..................... 310/227 |
| 3,898,367 A | | 8/1975 | Nakata | |
| 3,903,442 A | | 9/1975 | Krulls | |
| 4,029,890 A | | 6/1977 | Nakata | |
| 4,029,891 A | | 6/1977 | Nakata | |
| 4,029,892 A | | 6/1977 | Nakata | |
| 4,042,774 A | | 8/1977 | Nakata et al. | |
| 4,119,873 A | * | 10/1978 | Sakurai | ........................ 310/56 |
| 4,296,346 A | | 10/1981 | Ooki et al. | |
| 4,410,821 A | | 10/1983 | Kurt | |
| 4,476,410 A | | 10/1984 | Wolcott | |
| 4,621,211 A | | 11/1986 | Spirk | |
| 5,798,484 A | | 8/1998 | Yamagiwa et al. | |
| 5,923,113 A | * | 7/1999 | Lassila et al. | .............. 310/232 |
| 6,166,462 A | * | 12/2000 | Finkenbinder et al. | ........ 310/63 |
| 6,215,212 B1 | * | 4/2001 | Grennan et al. | .......... 310/60 R |
| 6,465,926 B2 | | 10/2002 | Rehder et al. | |
| 2002/0070623 A1 | | 6/2002 | Rehder et al. | |

FOREIGN PATENT DOCUMENTS

DE       21 23 278 A    11/1972

OTHER PUBLICATIONS

Diessner et al—Free Conducting Particles in a Coaxial Compressed–Gas–Insulated System—IEEE Transactions on Power Apparatus and Systems, vol. PAS–89, No. 8, Nov./Dec. 1970.

Untitled Article—circa 1972—pp. 559–564.

* cited by examiner

*Primary Examiner*—Tran Nguyen

(57) ABSTRACT

An electrical current collector system has an electrically conductive slip ring mounted to a rotatable shaft and a fixed conducting ring assembly forming a partially enclosed AC high voltage electrical current conductive ring channel in which slip ring contacting members are mounted. A compartment at ground potential at least partially encloses the slip ring and the fixed conducting ring assembly. A source directs a fluid into the compartment so that the fluid travels through into the conductive ring channel to perform at least one of cooling and cleaning of the slip ring contacting members. A hollow conically shaped insulator has a frustum with a narrower cross-sectional opening connected to the conductive ring channel and a larger diameter cross-sectional portion passing through and connected to the compartment for exhausting the fluid from the current conductive ring channel.

29 Claims, 4 Drawing Sheets

ELECTRICAL CURRENT COLLECTOR CLEANING AND COOLING FOR HIGH VOLTAGE ROTATING MACHINES

FIELD OF THE INVENTION

The present invention relates to an electrical current collector for a high voltage rotating machine and, in particular, relates to an insulator and filter used for cleaning and cooling the current collector.

BACKGROUND OF THE INVENTION

There are systems, such as, for example, synchronous motors and generators, which supply electrical current to a rotor winding by way of slip rings. The current is typically applied to the slip rings via brushes mounted on a fixed conducting ring. Ordinarily the slip rings are at low voltage, however, the slip rings may be used in high voltage applications.

A slip ring assembly for use in high voltage machines and applications is disclosed in U.S. Pat. No. 6,465,926 issued Oct. 15, 2002 to Rehder et al entitled Cleaning/Cooling of High Power Rotary Current Collection System. This patent discloses an electrical current collector system that includes for each phase a fixed conducting ring; brushes; an electrically conductive slip ring; and a slip ring support assembly. Cooling air is circulated through the collector system for high voltage rotating machines and is exhausted from collector housing through a cylindrically shaped exhaust passageway and filtering device. This passageway also includes the bus bar that feeds power to and from the fixed conducting ring. Typically, the cooling air stream passes over the brushes in the collector system and in so doing the cooling air moves and carries carbon particles or dust produced as a result of brush wear out through the exhaust duct passageway in the bus bar. This passageway, however, is limited in cross-sectional area due to the primary purpose of the bus bar to carry current. Hence the air flow is limited. Any build up of carbon particles can result in shorting of the windings of the machine if not properly removed from the air flow.

Accordingly, there is a need in high voltage collector systems for rotating machines and transformers to have an exhaust passageway that provides an insulated exhaust passageway between the high voltage environment of the collector system and the ground potential beyond the exhaust passageway that allows collector cooling air to pass through the exhaust passageway unimpeded and without the exhaust passageway being prone to creep buildup of carbon particles along its inner surfaces. Further, there is a need to filter the collector cooling air after it passes through the exhaust passageway.

SUMMARY OF THE INVENTION

The present invention relates to an electrical current collector system comprising an electrically conductive slip ring mounted to a rotatable shaft and a fixed conducting ring assembly forming a partially enclosed AC high voltage electrical current conductive ring channel in which slip ring contacting members are mounted. A compartment at ground potential at least partially encloses the slip ring and the fixed conducting ring assembly. A source directs a fluid into the compartment so that the fluid travels through into the conductive ring channel to perform at least one of cooling and cleaning of the slip ring contacting members. A hollow conically shaped insulator has a frustum with a narrower cross-sectional opening connected to the conductive ring channel and a larger diameter cross-sectional portion passing through and connected to the compartment for exhausting the fluid from the current conductive ring channel.

The present invention may include a collection chamber mounted to the compartment outer wall and surrounding a portion of the insulator that extends beyond the compartment. The collection chamber has a filter spaced from and across the outlet port of the insulator for filtering particles from the fluid as the fluid passes through the filter.

The conical shape of the hollow insulator has an electric field profile where equipotential lines tangent to the flow of fluid through the insulator increase in distance between the lines. The conical shape of the insulator exaggerates the stress distribution of the electric potential field so as to be favourable to the carbon particles passing therethrough so that the particles do not move into contact with the inner side wall of the insulator. As a result, carbon particles in the fluid have a tendency to move along a central portion of the insulator spaced from the inside walls of the insulator. This inhibits creepage build-up of carbon particles on the inside surface walls of the insulator which could result in shorting conditions for the rotor assembly. Also, the size of the insulator is governed by the amount of fluid flow needed to cool and clean the electrical current collector system.

In one example deployment, the present invention is utilized in a rotating transformer system wherein the electrical current collector system applies current to a rotor assembly having rotor windings which rotate about the rotatable shaft, and wherein a stator has stator windings, and a motor is provided for rotating the rotor assembly.

BRIEF DESCRIPTION OF THE DRAWINGS

For a better understanding of the nature and objects of the present invention reference may be had to the accompanying diagrammatic drawings in which.

DETAILED DESCRIPTION OF THE INVENTION

Figure 1:
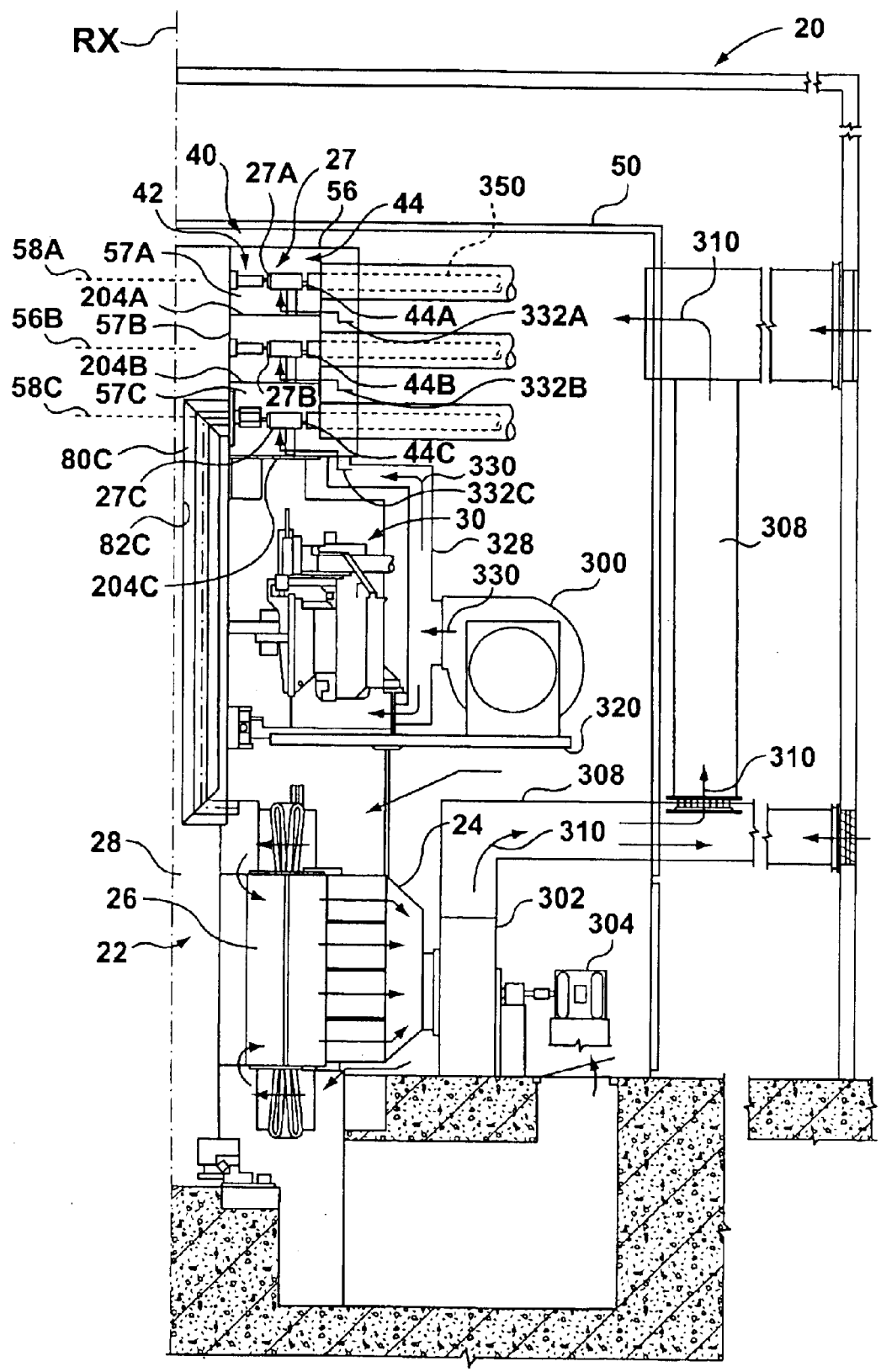
FIG. 1 is a side sectional view of a prior art rotating transformer system.

FIG. 1 shows a rotary transformer system 20 as disclosed in U.S. Pat. No. 6,465,926 issued Oct. 15, 2002 to Rehder et al, which is incorporated herein by reference in its entirety, which includes both a rotor assembly 22 and a stator 24 having windings 25. The rotor assembly 22 includes a rotor cage section 26, rotor windings 21, slip rings (also known as collector rings and generally depicted by reference numeral 27), and a rotatable shaft 28. Rotor assembly 22 is rotatable about an axis RX of its rotatable shaft 28 in both a clockwise direction and a counter-clockwise direction. Rotation of rotor assembly 22 is effected by a drive motor 30.

The rotary transformer system 20 is employed in a high voltage, high current environment having alternating voltages and current. In this example of deployment, rotary transformer system 20 is connected to transfer electrical power between a first electrical system (e.g., first electrical grid) and a second electrical system (e.g., second electrical grid). In such deployment, one of the rotor assembly 22 and the stator 24 is connected (e.g., by three phase lines) to the first electrical system, and the other is connected to the second electrical system. The drive motor 30 rotates the rotor assembly 22 in response to a drive signal generated by an unillustrated control system. The first and second electrical systems may have a differing electrical characteristic (e.g., frequency or phase). The control system can bi-directionally operate the rotary transformer system 20 at a variable speed for transferring power from the first electrical system to the second electrical system or vice versa (i.e., from the second electrical system to the first electrical system).

A collector system 40 positioned at the top of rotor assembly 22 comprises the slip rings 27; a slip ring support assembly 42; and, fixed conducting ring assembly 44. In view of its example deployment in a three phase system, the collector system 40 has three slip rings 27A, 27B, and 27C (any one of which is generically referred to as slip ring 27) and three corresponding fixed conducting ring assemblies 44 (any one of which is generically referred to as fixed conducting ring assembly 44). Three-phase lines leading from one of the connected electrical systems are connected to respective ones of fixed conducting ring assemblies 44 of collector system 40 of rotor assembly 22. Other three-phase lines connect the other electrical system to stator 24. In the illustrated example embodiment, the slip rings 27 are 17 KV rated rings.

The collector system 40 can be situated in a compartment 56 of housing 50, in the manner shown in FIG. 1. The compartment 56 is subdivided into three air-sealed subcompartments 57A–57C. These subcompartments are preferably phase isolated from each other and may alternatively be phase segregated. The collector system 40, which is used to interface electrically with rotor assembly 22, has structure essentially residing on three distinct planes, herein referred to as phase planes. In the situation depicted in FIG. 1 in which rotary transformer system 20 is vertically mounted, the three phase planes of collector system 40 are substantially horizontal planes. In a first or uppermost such phase plane, depicted by broken line 58A, both slip ring 27A and fixed conducting ring assembly 44A reside within subcompartment 57A. Similarly, in a second or middle phase plane 58B both slip ring 27B and fixed conducting ring assembly 44B reside within subcompartment 57B; and in a third or lowermost phase plane 58C both slip ring 27C and fixed conducting ring assembly 44C reside within subcompartment 57C.

Figure 2:
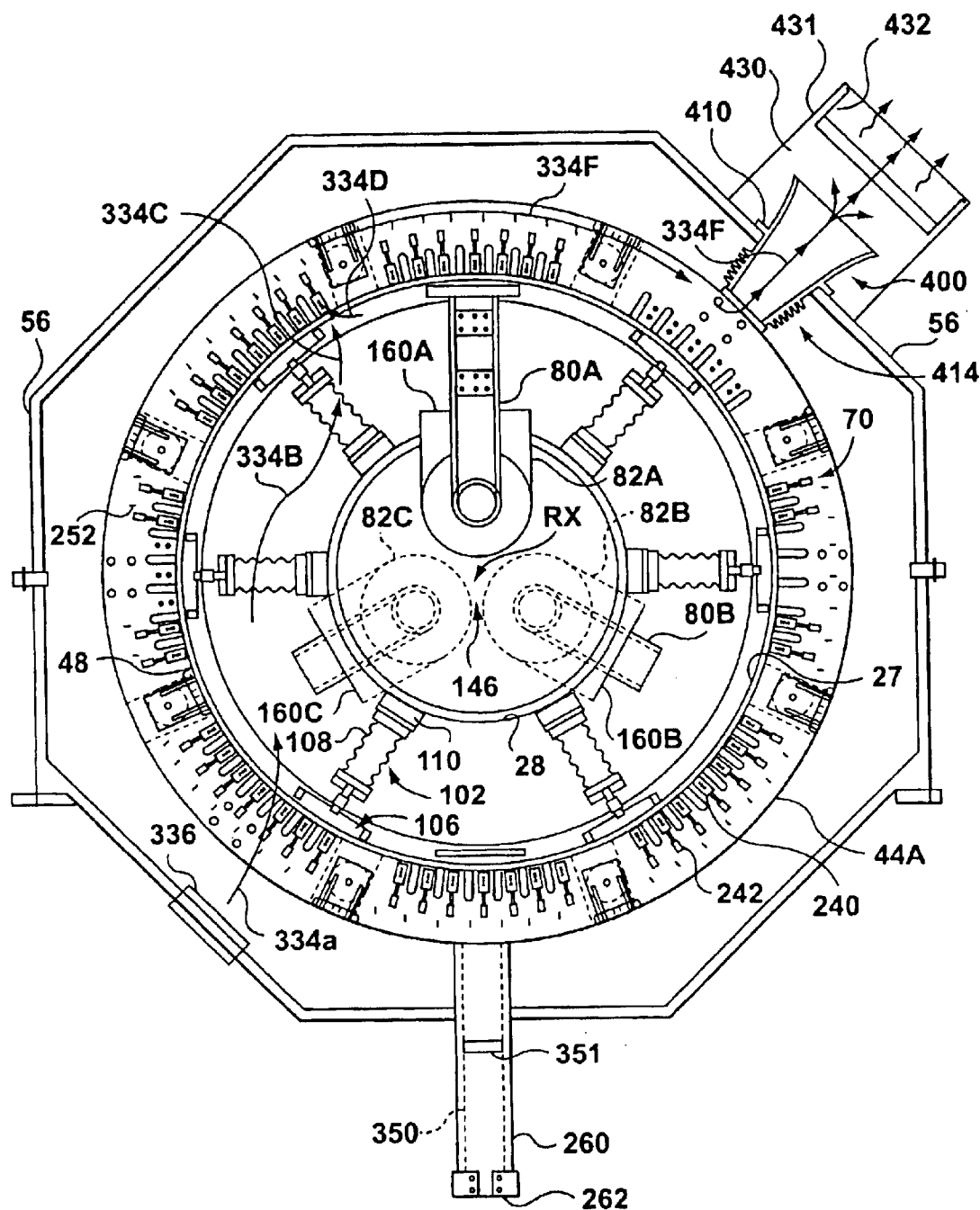
FIG. 2 is a top sectional view of the rotating transformer system showing the conical shaped insulator of the present invention.

A slip ring support assembly 42 is provided for each phase plane 58 of collector system 40. With respect to a representative one of the phase planes 58, FIG. 2 shows slip ring support assembly 42 as comprising plural post insulators 102 mounted discretely at selected intervals about the outer circumference of rotatable shaft 28. As an example, FIG. 2 shows six post insulators 102 arranged about axis RX. Each of the post insulators 102 extend essentially radially from periphery of rotatable shaft 28 and have an attachment/adjustment assembly 106 surmounted thereon.

Each of the fixed conducting ring assemblies 44 have brush assemblies 70 (slip ring contacting members) mounted thereon angularity about rotatable shaft 28 at intervals. Electrical current is transferred between the brushes of the brush assemblies 70 and the respective slip rings 27, and hence between the rotor assembly 22 and the electrical system connected to the fixed conducting ring assembly 44. The electricity travels between the slip rings 27 and the windings of the rotor assembly 22 over bus conductors 80. There is a bus conductor 80 for each of the three phases, e.g., bus conductors 80A, BOB, and 80C, only bus conductor 80C being shown in FIG. 1. Each of the bus conductors 80 extends through a respective one of three phase isolated bus ducts 82 (only bus duct 82 being shown in FIG. 1).

Figure 3:
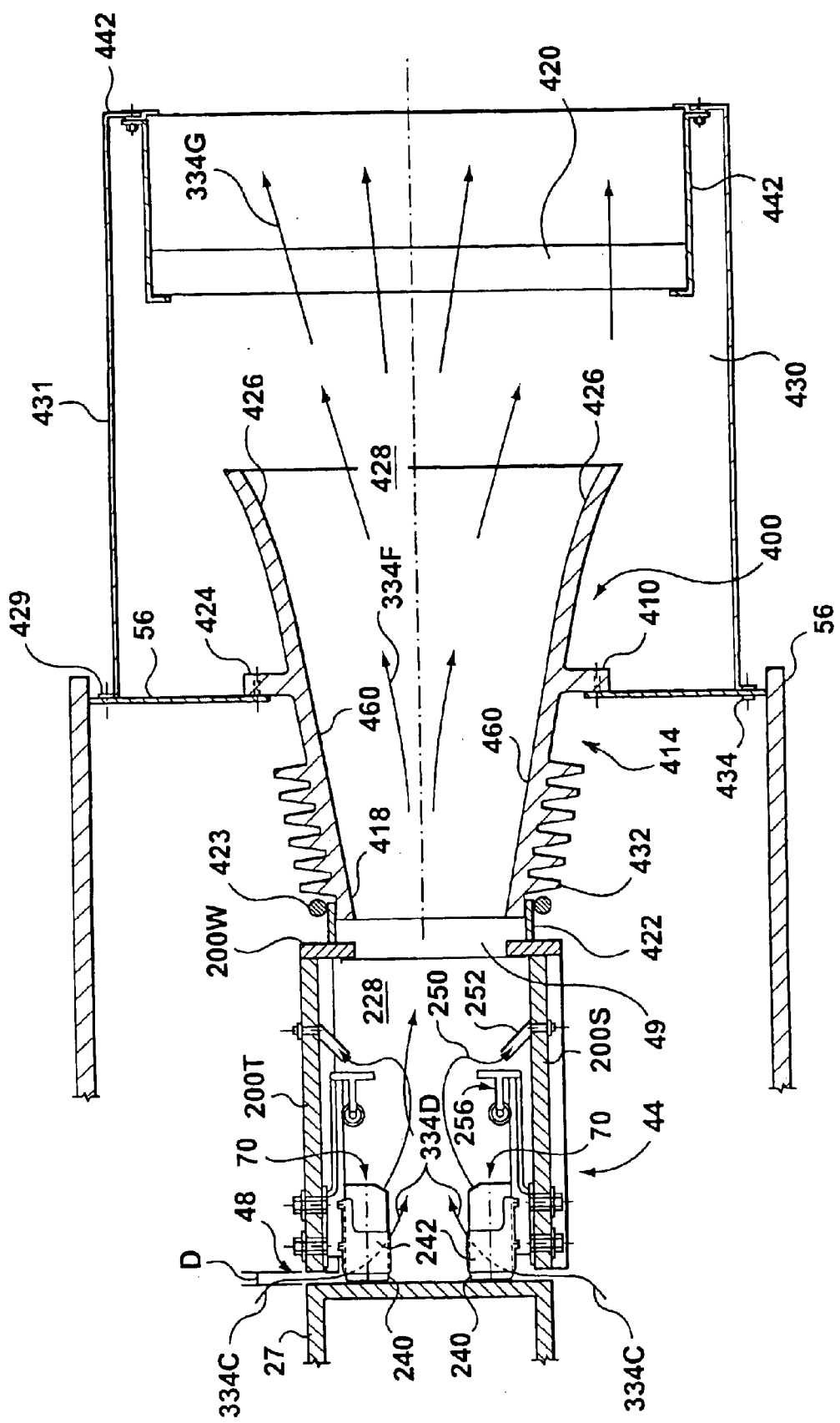
FIG. 3 is an enlarged sectional view showing a gap between a U-shaped ring structure and a slip ring and includes a cross-sectional view of the conical shaped insulator of the present invention; and, FIG. 4 is a partial half view of the insulator showing the equipotential electric field lines passing through the insulator of the present invention.

Referring to FIGS. 2 and 3, each fixed conducting ring assembly 44 comprises a U-shaped ring structure mounted on ring support insulation post and a ring support shelf (not shown). The ring support shelf serves to form a partition or grounded metal sheet between the subcompartments 57 of compartment 56. Reference may be made to the aforementioned U.S. Pat. No. 6,465,926 for a more detailed description of the insulation posts and support shelf.

The U-shaped ring structure 200 has a top conductive ring plate 200T, a bottom conductive ring plate 200B, and a covering wall 200W attached thereto. A conductive ring channel 220 is formed in the interior of U-shaped ring structure 44, e.g., between top conductive ring plate 200T and a bottom conductive ring plate 200B.

The fixed conducting ring assemblies 44 of each phase plane have brush assemblies 70 situated and mounted thereon in the manner shown, e.g., in FIG. 2 and FIG. 3. The brush assemblies 70 are positioned at angular locations about rotatable shaft 28 in the manner shown in FIG. 2. In the example illustrated embodiment, each U-shaped ring structure 44 has eighty six brush assemblies 70 provided thereon in forty three pairs, with forty three brush assemblies 70 being suspended from beneath the top conductive ring plate 200T and another forty three brush assemblies 70 being mounted on bottom conductive ring plate 200B.

An example pair of brush assemblies 70 employed by rotary transformer system 20 is illustrated in FIG. 3. Each brush assembly 70 comprises a carbon brush 240 and a brush holder 242. The brush holders 242 are suspended from top conductive ring plate 200T and mounted on bottom conductive ring plate 200B by bolts and washers. An insulation board (not shown) is interposed between the brush holder 242 and the ring plates 200T, 200B. Electrically conducting leads (e.g., copper braids) 250 emanate from the rear end of the carbon brushes 240, and terminate at a quick disconnect terminal 252 which is electrically conductivity mounted by fasteners in one of the ring plates 200T, 200B. Each brush assembly 70 includes negator spring assemblies 256 for exerting an essentially constant biasing force on the carbon brushes 240 toward slip ring 27. Reference may be made to the aforementioned U.S. Pat. No. 6,465,926 for a more detailed description of the fixed conducting ring and brush assemblies.

As shown in FIG. 2, each U-shaped ring structure 200 has an electrically conductive bus bar 260 extending radially therefrom. Bus bar 260 passes through and is insulated from compartment wall 56. At its distal end remote from U-shaped ring structure 200, the bus bar 260 has a bus connector 262 provided thereon. Each bus bar 260 has a duct 350 which is provided with a plug 351 welded therein so as to prevent air flow along the bus duct 350. This prevents any coolant air carrying carbon particles from flowing along the bus bar 260.

Referring to FIGS. 2 and 3 a hollow conically shaped insulator 400 is shown extending from the wall 200W of the conductive ring channel 44. The hollow insulator 400 is connected to the compartment 56 by a flange 410 that has bolts 424 passing therethrough. The hollow conical shaped insulator 400 has a frustum shape 414 that extends between the fixed conducting ring 44 and the compartment wall 56. The frustum 414 has a series of ribs 432 that provide increased electrical creepage length to the insulator and the O-ring 423 allows for any expansion between dissimilar materials of the insulator 400 and the fixed conducting ring 44. As best seen in FIG. 3, the fixed conducting ring 44 has an opening 49 in wall 200W and is provided with an annular flange 422 comprising a copper material. The insulator 400 has a narrower end or opening 418 inserted into the annular flange 422 and held in place within the copper flange 422 by the O-ring 423. This attachment allows for some slippage between the insulator 400 and the conductive ring 44 due to dissimilar rates of thermal expansion of these parts. The insulator has a larger diameter cross-sectional portion 465 that passes through and is connected to compartment 56. It should be understood that the insulator 400 comprises a cycloaliphatic epoxy or may comprise any other form of suitable electrical insulation made from a polymeric epoxy or ceramic such as porcelain.

Figure 4:
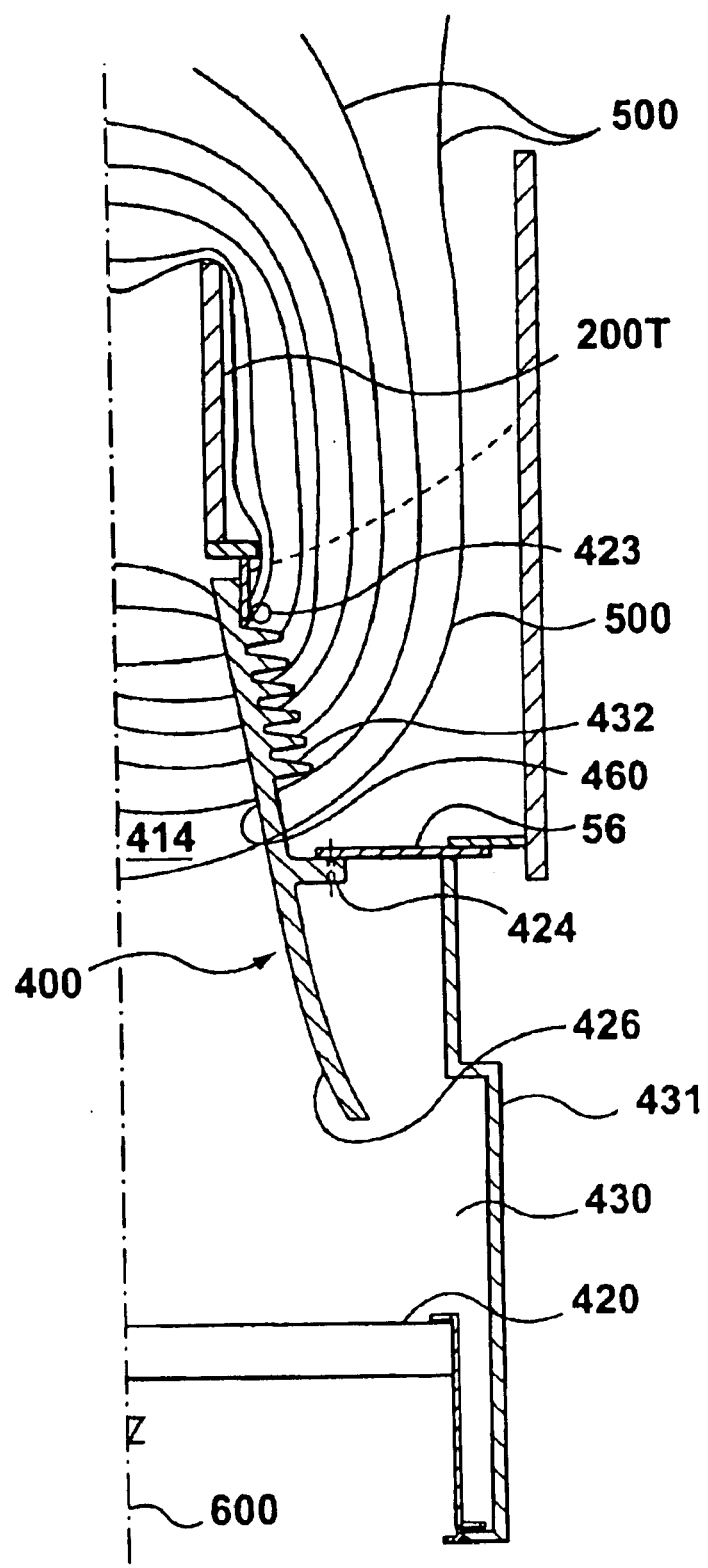

The inside walls 460 of the insulator 400 diverge convexly at walls 426 located beyond the compartment 56 and flange 424. The purpose of the divergent wall 460 is twofold. One purpose is to increase the opening surface area 428 throughwhich the fluid exhausting the fixed conductor ring 44 travelling as shown by air path 334F increases such that air velocity out of opening 428 and into adjacent filter 420 is low enough for the filter to effectively absorb the carbon particles contained within the air flow. The other reason that the walls 460 convexly diverge is to further inhibit creepage build up of carbon particles beyond the influence of the electric field profile (as shown in FIG. 4) between the high voltage connection at copper flange 422 and the ground connection at flange 424 to the compartment 56. The conical shape of the frustum 414 results in the distance between the equi-potential lines 500 (See FIG. 4) passing through the hollow insulator 400 in the vicinity of the frustum 414 increasing in distance between these lines 500 along the central axis 600. Consequently, any charged particles or carbon particles capable of being charged by the high voltage within the collector system are influenced by the electrical field profile to flow through the center of the insulator 400 and not flow adjacent the internal walls of the insulator 400.

FIGS. 2 and 3 further show a collection chamber 430 which comprises a rectangular shaped chamber having side walls 431 and flanges 429 mounted by bolts 434 to the compartment wall 56. It should be understood that for higher current ratings, the chamber 430 may be cylindrical in shape. The side walls 431 are provided with an inturned flange 442 bolted thereto. Flange 442 has filter 420 mounted and supported therefrom. The filter is a conventional industrial filter for carbon dust so as to eliminate carbon dust having particle size of less than about 1 micron. As a result, the use of the filter and the insulator provides an effective manner for allowing the fluid to escape along path 334G thereby permitting for a cooling of the fixed conductive ring and at the same time eliminating or removing the carbon particles by the filter 420 from the fluid stream 334F.

It should be understood that the shape of the insulator 400 provides significant advantage over merely the use of a hollow insulator. Due to the electric field profile between the fixed conductive ring operating at a high voltage potential and the ground potential of the casing 56, the shape of the hollow insulator 400 inhibits any carbon particles from depositing and forming a creep layer along the inside surface walls of the insulator 400. This thereby inhibits the carbon particles from creating shorting conditions along the inside walls of the insulator.

Since rotary transformer system 20 is operating at a high voltage, it must be enclosed. The enclosures for rotary transformer system 20, including compartment 56 of housing 50, are described above. However, in the enclosure dust produced from the wearing of the carbon brushes 240 can accumulate inside the enclosures and contaminate insulation surfaces, such as the post insulators 102. Therefore, in accordance with one aspect of rotary transformer system 20, a cooling/cleaning fluid (e.g., air) is introduced and the flow of this cooling/cleaning fluid is controlled to carry the brush dust away from the post insulators 102. Moreover, the air flow gap 48 between slip ring 27 and fixed conducting ring assembly 44 plays a part in the cleaning and cooling of rotary transformer system 20. The cooling/cleaning fluid passes through the air flow gap 48, past the contact points of carbon brushes 240, and then along a semicircular envelope toward the exhaust insulator 400. The moving cooling/cleaning fluid provides a means of carrying away heat from the carbon brushes 240 and the fixed conducting ring assembly 44, reducing the temperature rise due to electrical losses and mechanical friction.

Elaborating upon the foregoing, as shown in FIG. 1, rotary transformer system 20 has one or more cooling/cleaning sources, such as ventilation fan 300 and ventilation fan 302. The ventilation fan 302 has a fan motor 304, and is connected to apply ventilation fluid, also known as cooling/cleaning fluid (e.g., air), via duct system 308 to the interior of housing 50, as indicated by fluid flow indication arrows 310. The ventilation fan 300 is mounted on bracket 320 (attached to housing 50), and serves both motor 30 and compartment 56, including the cooling and cleaning of the slip rings 27 and the fixed conducting ring assemblies 44 with their brush assemblies 70. The cooling/cleaning fluid (e.g., air) passes from ventilation fan 300 through duct system 328 as shown by fluid flow indication arrows 330. The duct system 328 has an exit portal or the like for each phase plane 58, so that for each phase plane 58 the ventilation fluid enters into the interior of the respective subcompartments 56A, 56B, and 56C, as depicted by fluid flow indication arrows 332A–332C in FIG. 1.

An example path of the cooling/cleaning fluid for a single example phase plane 58 is shown from above rotary transformer system 20 in FIG. 3. In this regard, FIG. 2 shows by fluid flow indication arrow 334A the cooling/cleaning fluid entering through a portal 336 of duct system 328. The cooling/cleaning fluid entering the subcompartment 58 is blown toward the center of the hexagonal shaped subcompartment 58, filling the interior of subcompartment 58 up to rotatable shaft 28. As such, the entering cooling/cleaning fluid sweeps around each of the post insulators 102, as indicated by fluid flow indication arrow 334B in FIG. 2. The cooling/cleaning fluid then flows over the slip ring 27, as indicated by fluid flow indication arrow 334C, which cools the slip ring 27. The cooling/cleaning fluid then enters the air flow gap 48 (depicted in FIG. 3) between the slip ring 27 and fixed conducting ring assembly 44, as indicated by fluid flow indication arrow 334C (shown in FIG. 2 but better illustrated in FIG. 3). The air flow gap 48 thus directs the flow of cooling/cleaning fluid across the interface of the carbon brush 240 and slip ring 27. The cooling/cleaning fluid thereby enters the conductive ring channel 220 in the brush assembly 70 and passes over the brush assembly 70 (depicted by fluid flow indication arrow 334D in FIG. 3). Once in the conductive ring channel 220, the cooling/cleaning fluid travels in the conductive ring channel 220 in a semicircular path around the fixed conducting ring assembly 44, in the manner illustrated by fluid flow indication arrow 334E (see FIG. 2). Thus, inside fixed conducting ring assembly 44 the cooling/cleaning fluid moves in a semicircular fashion, even when there is no rotation of rotatable shaft 28. The cooling/cleaning fluid is then exhausted from compartment 58 through an exhaust duct 350, as illustrated by fluid flow indication arrow 334F in FIGS. 2 and 3.

The velocities of the cooling/cleaning fluid is greater within the conductive ring channel 220 of fixed conducting ring assembly 44 than in the spacing interior to slip ring 27, facilitating pick up of brush dust and the like as the cooling/cleaning fluid moves around the ring shape of the conductor envelope assembly. But even in the space interior to 27, there is movement of cooling/cleaning fluid past the post insulators 102, tending to keep them clean.

Air has been cited above as one example of a suitable cooling/cleaning fluid. Other non-limiting examples of suitable fluid which can serve as the cooling/cleaning fluids are oil, hydrogen gas, and sulfahexaflouride gas (SF6). Usage of SF6 in a closed or sealed system can reduce the size of collector system 40. SF6 has a higher thermal conductivity and higher dielectric strength than air. With SF6 at one atmosphere pressure, the distance between conductors and ground can be reduced to half the air clearances.

It should be understood further that ventilation fan 300 and ventilation fan 302 are just examples of sources of the cooling/cleaning fluid. Other sources which can direct the cooling/cleaning fluid into the appropriate compartments are also within the scope of the invention, such as pressurized sources of cooling/cleaning fluid, for example. Further, it is envisaged that the flow of fluid into the conductive ring channel 220 could be introduced by ducting passing through one or more of walls 200T, 200B and 200W in addition to air passing through the air gap 48.

As used herein, high voltage" in the rotating machine art is understood to be in a range of 13.8 kV up to at least 26 kV, and can be higher. Low voltage is generally considered to be 4 KV and below; medium voltage is deemed to be 6600 v and 7200 v.

While the invention has been described in connection with the above described embodiment, it is to be understood that the invention is not to be limited to the disclosed embodiment, but on the contrary, is intended to cover various modifications and equivalent arrangements included within the spirit and scope of the appended claims.

What is claimed is:

1. An electrical current collector system comprising:
   an electrically conductive slip ring mounted to a rotatable shaft;
   a fixed conducting ring assembly forming a partially enclosed AC high voltage electrical current conductive ring channel in which slip ring contacting members are mounted;
   a compartment at ground potential for at least partially enclosing the slip ring and the fixed conducting ring assembly;
   a source which directs a fluid into the conductive ring channel to perform at least one of cooling and cleaning of the slip ring contacting members; and,
   a hollow conically shaped insulator having a frustum with a narrower cross-sectional opening connected to the conductive ring channel and a larger diameter cross-sectional portion passing through and connected to the compartment for exhausting the fluid from the current conductive ring channel.

2. The system of claim 1 wherein the slip ring and fixed conducting ring assembly are mounted to have a gap formed therebetween and wherein the source directs the fluid into the compartment so that the fluid travels through the gap and into the conductive ring channel to additionally perform at least one of cooling and cleaning of an interface of the slip ring and the slip ring contacting member.

3. The system of claim 1 wherein the insulator continues to extend in a widening conical shape to an outlet port located beyond the compartment.

4. The system of claim 3 wherein the insulator has a diameter that increases beyond the compartment.

5. The system of claim 4 wherein the insulator has an inside wall portion that has a convex curvature beyond the compartment.

6. The system of claim 3 further including a collection chamber mounted to the compartment and surrounding a portion of the insulator that extends beyond the compartment, and the collection chamber having a filter spaced from and across the outlet port of the insulator for filtering particles from the fluid as the fluid passes through the filter.

7. The system of claim 1 wherein the insulator is slidably connected to the conductive ring channel.

8. The system of claim 1, wherein the slip ring contacting members are brushes.

9. The system of claim 2, further comprising a slip ring support assembly comprising plural post insulators spaced radially about a rotatable shaft for attaching the conductive slip ring to the rotatable shaft, and wherein the source directs the fluid over at least some of the post insulators for cleaning of the post insulators prior to directing the fluid through the gap.

10. The system of claim 1, wherein the source of the fluid is a fan.

11. The system of claim 1, wherein the conductive ring channel directs the fluid in at least a partially semicircular path to the hollow conically shaped insulator.

12. The system of claim 1, wherein the fixed conducting ring assembly comprises a first conducting plate and a second conducting plate positioned parallel to one another to form a conductive ring channel therebetween, and wherein the slip ring contacting members are mounted in the conductive ring channel.

13. The system of claim 12, wherein at least some of the slip ring contacting members are mounted on the first conducting plate and at least others of the slip ring contacting members are mounted on the second conducting plate.

14. The system of claim 12, wherein the slip ring contacting members are mounted in pairs in the fixed conducting ring assembly, one slip ring contacting member of each pair being mounted on the first conducting plate and another slip ring contacting member of each pair being mounted on the second conducting plate.

15. A rotating transformer system comprising:
   a rotor assembly having rotor windings which rotates about a rotatable shaft;
   a stator having stator windings;
   a motor for rotating the rotor assembly;
   a high voltage current collector system through which current is applied to the rotor assembly, and wherein the high voltage current collector system comprises:
   an electrically conductive slip ring mounted to a rotatable shaft;
   a fixed conducting ring assembly forming a partially enclosed current conductive ring channel in which slip ring contacting members are mounted;

a compartment at ground potential for at least partially enclosing the slip ring and the fixed conducting ring assembly;

a source which directs a into the conductive ring channel to perform at least one of cooling and cleaning of an interface of the slip ring and the slip ring contacting members; and, a hollow conically shaped insulator having a frustum with a narrower cross sectional opening connected to the conductive ring channel and a larger diameter cross sectional portion passing through and connected to the compartment for exhausting the fluid from the current conductive ring channel.

16. The system of claim 15 wherein the slip ring and fixed conducting ring assembly are mounted to have a gap formed therebetween and wherein the source directs the fluid into the compartment so that the fluid travels through the gap and into the conductive ring channel to additionally perform at least one of cooling and cleaning of the interface of the slip ring and slip ring contacting members.

17. The system of claim 15 wherein the insulator continues to extend in a widening conical shape to an outlet port located beyond the compartment.

18. The system of claim 17 wherein the insulator has a diameter that increases beyond the compartment.

19. The system of claim 18 wherein the insulator has an inside wall portion that has a convex curvature beyond the compartment.

20. The system of claim 17 further including a collection chamber mounted to the compartment and surrounding a portion of the insulator that extends beyond the compartment, and the collection chamber having a filter spaced from and across the outlet port of the insulator for filtering particles from the fluid as the fluid passes through the filter.

21. The system of claim 15 wherein the insulator is slidably connected to the conductive ring channel.

22. The system of claim 16, wherein the gap is an annular gap.

23. The system of claim 16, wherein the slip ring contacting members are brushes.

24. The system of claim 16, further comprising a slip ring support assembly comprising plural post insulators spaced radially about the rotatable shaft for attaching the conductive slip ring to the rotatable shaft, and wherein the source directs the fluid over at least some of the post insulators for cleaning of the post insulators prior to directing the fluid through the gap.

25. The system of claim 15, wherein the source of the fluid is a fan.

26. The system of claim 25, wherein the conductive ring channel directs the fluid in at least a partially semicircular path to the hollow conically shaped insulator.

27. The system of claim 15 wherein the fixed conducting ring assembly comprises a first conducting plate and a second conducting plate positioned parallel to one another to form a conductive ring channel therebetween, and wherein the slip ring contacting members are mounted in the conductive ring channel.

28. The system of claim 27, wherein at least some of the slip ring contacting members are mounted on the first conducting plate and at least others of the slip ring contacting members are mounted on the second conducting plate.

29. The system of claim 27, wherein the slip ring contacting members are mounted in pairs in the fixed conducting ring assembly, one slip ring contacting member of each pair being mounted on the first conducting plate and another slip ring contacting member of each pair being mounted on the second conducting plate.

* * * * *